May 29, 1962 A. BOUZEMBURG 3,037,090
SYSTEM FOR DUPLICATING MAGNETIC TAPE RECORDS
Filed Jan. 25, 1957
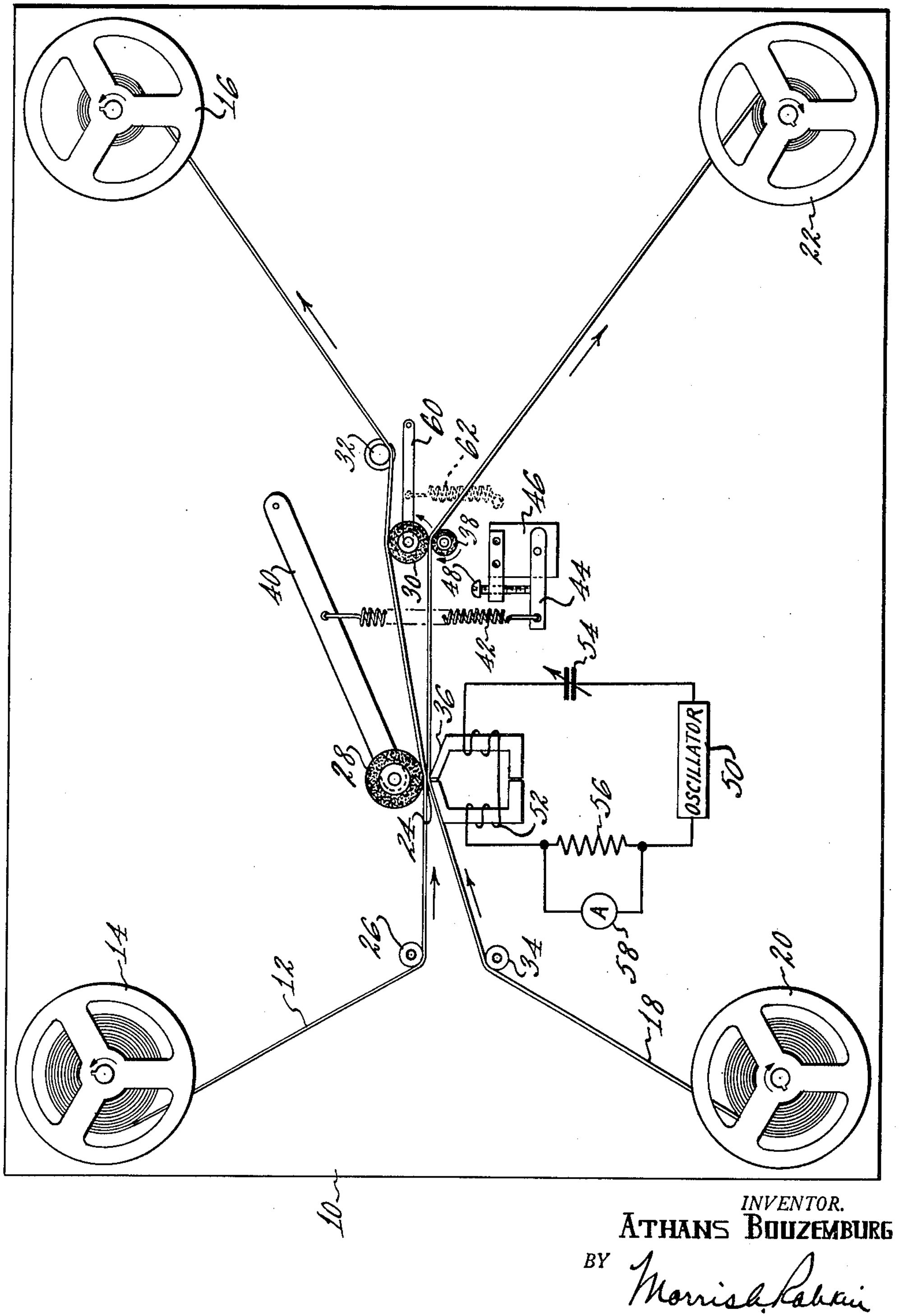
INVENTOR.
ATHANS BOUZEMBURG
BY Morris A. Rabkin
ATTORNEY United States Patent Office 3,037,090

Patented May 29, 1962

3,037,090

SYSTEM FOR DUPLICATING MAGNETIC TAPE RECORDS

Athans Bouzemburg, Pennsauken, N.J., assignor to Radio Corporation of America, a corporation of Delaware Filed Jan. 25, 1957, Ser. No. 636,276
8 Claims. (Cl. 179—100.2)

This invention relates to systems for duplicating magnetic tape records, and more particularly to apparatus especially adaptable for use in magnetic record duplicating systems wherein the master and blank record are maintained in contact during the duplicating process.

The magnetic tape record duplicating technique wherein the master and blank record are maintained in contact with each other during the duplicating process is discussed in a patent to D. L. Blaney, Pat. No. 2,686,-229, issued August 10, 1954. It is important that there is no relative motion between the blank, unrecorded tape and the prerecorded master tape record while the information recorded on the master record is being transferred to the blank. The result of any relative motion between the tapes during the duplicating process is distortion and loss of fidelity of reproduction in the duplicate record. The higher frequency components of the recorded information are particularly degraded.

The present invention provides improved apparatus for transporting or driving a plurality of elongated web mediums, such as paper and plastic tapes, in contact with each other without slippage or other relative motion between the mediums. Apparatus using the invention, therefore, provides an improved system for duplicating magnetic records.

Briefly described, the invention provides a different path of travel for the master tape record and for the blank tape. At a point common to both paths of travel, where the duplication process is effected, the master and blank tapes are maintained in contact with each other, desirably under a predetermined amount of pressure. The paths of the master and duplicate tapes are arranged to diverge after passing through the common, contact point. Driving forces are applied to a single one of the tapes at a position spaced along the path of travel from the common contact point, as, for example, by a capstan and pressure roller assembly. Since the master and duplicate tapes are in contact at a single point, driving forces are transferred between the master and duplicate at only that point so that one tape drives the other. Slippage and other relative motion between the tapes is eliminated, and high speed duplication of magnetic tape records is made possible.

It is an object of the present invention to provide an improved system for duplicating magnetic records.

It is a further object of the present invention to provide an improved system for transporting a pair of elongated web mediums along paths having portions in common without relative motion between the mediums as they travel along the common portions.

It is a still further object of the present invention to provide a system for duplicating magnetic records with higher fidelity in the duplicate record than heretofore possible, particularly for the higher frequency components of the duplicated recorded signals.

It is a still further object of the present invention to provide an improved system for duplicating magnetic records without introducing distortion.

Other objects and advantages of the present invention will, of course, become apparent and immediately suggest themselves to those skilled in the art to which the invention is directed from a reading of the following description in connection with the accompanying drawing, the sole FIGURE of which schematically shows an illustrative embodiment of the invention.

In the drawing, a panel 10 is shown which supports the components of the system provided by the invention. The master record 12 is disposed on a supply reel 14 and a take-up reel 16 and travels along the path therebetween. The take-up reel 14 and the supply reel 16 are desirably driven in opposite directions in order to maintain the master tape record 12 taut. These reels 14 and 16 may be driven through slipping clutches (not shown).

The blank record 18 to be duplicated is wound on a supply reel 20 and a take-up reel 22 which are operated to rotate in opposite directions, similarly to the supply and take-up reels 14 and 16 for the record 12. The direction of rotation of the reels 14, 16, 20 and 22 is indicated by arrows.

The master record 12 and the blank record 18 travel over different paths which have a point 24 in common. The paths converge to contact at the common point 24 and then diverge therefrom. The path for the master record 12 is defined by an idler roller 26 closest the supply reel 14, a pressure roller 28, another pressure roller 30, and a flanged idler roller 32. The idler roller 32 is provided with a flange in order to restrict the lateral motion of the tape 12. Since the idler roller 32 is closest the take-up reel 16, it assists in permitting the tape 12 to wind evenly on the reel 16. The path of travel of the tape 18 to be duplicated is defined by an idler roller 34, a magnetic structure, which is shown illustratively herein as a magnetic head 36, and a capstan 38.

The pressure roller 28 and the magnetic head 36 are disposed on opposite sides of the paths of travel of the tape. The pressure roller is movable towards the head so as to engage the tape. A tire of some suitably resilient material, such as rubber, which is not excessively soft may be mounted on the pressure roller 28. A predetermined amount of pressure is applied to the tapes 12 and 18 in order to maintain proper, intimate contact between the tapes. Proper contact pressure is important for the operation of the duplicating process and in order to transfer the driving forces between the tapes, as will be brought out hereinafter. In order to apply the proper amount of pressure, the pressure roller 28 is mounted on a lever 40 movable about a pivot. The lever is attached through a spring 42 to a pivoted arm 44 of a spring tension adjusting device 46. The device 46 is mounted on the panel 10. The tension in the spring and the pressure applied to the tapes 12 and 18 may be adjusted by means of the bolt 48 which determines the position of the arm 44. It is desirable that the pressure roller 28 be substantially true; that is, without deviations of its surface from a circular shape. In this manner, a substantially line contact may be provided between the tapes 12 and 18. It has been found that a pressure of twenty to twenty-four ounces may be suitably applied to the tapes at the common contact point 24.

The magnetic head 36 provides a magnetic field which permeates the tapes 18 and 12 so as to effect the duplication of the master record 12 on the blank record 18. The head 36 may be energized with alternating current of supersonic frequency, for example, eighty kilocycles per second, by means of an oscillator 50. The oscillator 50 is connected to the winding 52 on the head 36 through a variable capacitor 54. The capacitor 54 serves to tune the head to the frequency of the energizing current so as to improve the efficiency of the operation of the head 36. A small resistor 56 may be inserted in the connection between the oscillator 50 and the winding 52 of the head 36. An ammeter 58 is connected across this resistor 56 so as to monitor the magnitude of the current supplied to the winding 52. The duplicating process has been described heretofore, as in the Blaney patent referred to above, and will not be discussed in detail herein.

In order to drive the tapes 12 and 18 between the reels 14, 16, 20 and 22, driving forces are applied to the duplicate tape 18. These driving forces are transferred to the master 12 at the contact point 24. The capstan 38 and pressure roller 30 are disposed on opposite sides of the duplicate tape 18 at a point along its path of travel between the contact point 24 and the take-up reel 22. The capstan 38 may be driven at a suitable speed, which may be much higher than the normal speed of reproduction, by a suitable motor (not shown). The pressure roller 30, which may be equipped with a tire of resilient material, is mounted on the end of a lever 60 movable about a pivot. The lever 60 is biased to engage the capstan 38 by means of a spring 62 located behind the panel 10. It may be observed that the pressure roller 30 is disposed between the duplicate tape and the master tape so as to engage both the duplicate tape and the master tape. The arrows on the capstan 38 and the pressure roller 30 indicate their direction of rotation. The pressure roller 30 tends to drive the master tape 12 in a direction opposite to its normal direction of travel. The master tape 12 will slide over the pressure roller 30 and a damping effect upon the master tape results. Thus, damping of any vibration of the master tape 12 may be provided in a simple and convenient fashion to further tend to eliminate any slippage between the tapes.

In some past attempts to drive a pair of tapes over paths having portions in common, both tapes were driven simultaneously by a single capstan and pressure roller assembly. Relative motion and slippage between the tapes results in such systems, particularly if contact pressure is applied to the juxtaposed, contacting tapes. Such slippage and relative motion results from differential frictional forces established along the common portions of the paths of travel. In other attempts to drive a pair of tapes, which have portions juxtaposed and in contact with each other, different driving forces have been applied to different ones of the tapes. It will be appreciated that the tapes must be driven at constant and equal velocity in order to avoid slippage; thus giving rise to the need for complex speed control mechanism. The present invention eliminates slippage and relative motion between the tapes, without the need for complex mechanisms and apparatus, by providing for the driving of only one tape and the transfer of motion to the other tape by the application of a predetermined amount of pressure between the tapes. In addition, the invention affords other operating conveniences, which will be apparent from the above description, to facilitate successful tape duplication.

It has been found that the fidelity of the duplicated tape records is dependent upon the slippage between the master and duplicate record at the contact point. The master record ordinarily has a coercive force higher than the duplicate. Thus, the master is more strongly magnetized than the duplicate after processing. When the master slips or otherwise moves in relation to the duplicate, a varying magnetic field is established adjacent to the duplicate, which tends to erase the recorded information on the duplicate. This erasing effect is most pronounced for the signals which are recorded as short wavelengths on the tape. Consequently, the reduction in relative motion between the master and the duplicate eliminates unwanted erasures and improves the fidelity of the duplicated record, particularly for higher frequency components of the recorded information which ordinarily have recorded wavelengths smaller than the lower frequency components of the information.

Unwanted erasures due to the magnetic interaction of the master and duplicate tapes are further minimized by the use, in accordance with the invention, of divergent paths of travel for the tapes immediately after they pass through the contact point 24.

What is claimed is:

1. A system for transporting a pair of elongated magnetic record mediums comprising means defining different paths of travel for said mediums which have a single, common driving point, means disposed along the path of travel of one of said mediums at a position spaced from said common point for engaging and driving said one medium, and means for engaging said mediums at said common point for maintaining successive portions of said mediums in driving contact with each other as said mediums travel along said paths for driving the other of said pair of mediums through said one medium.

2. A system for transporting a pair of elongated magnetic record mediums comprising means defining different paths of travel for said mediums which converge towards a single, common driving point and diverge immediately after passing through said common point, means disposed along the path of travel of one of said mediums along the diverging portions of said path at a position spaced from said common point for engaging and driving said one medium, and means for engaging said mediums at said common point for maintaining successive portions of said mediums in driving contact with each other as said mediums travel along said paths whereby said one medium drives the other of said pair of mediums.

3. A system for transporting a pair of elongated web mediums comprising means defining different paths of travel for said mediums which converge towards a common point and diverge after passing through said common point, means for engaging said mediums at said common point for maintaining successive portions of said mediums in contact as said mediums travel along said paths, means disposed along said path of travel of one of said mediums at a position spaced from said common point for engaging and driving said one medium, and an idler roller disposed between said paths along the diverging portions thereof, said idler roller being disposed in frictional driving contact with said one medium to be driven thereby and in sliding contact with the other of said mediums.

4. A system for transporting a pair of elongated magnetic record mediums comprising means defining different paths of travel for said mediums which have a single, common driving point, a capstan and pressure roller assembly located at a position along the path of travel of one of said mediums spaced from said common point for engaging and driving only said one medium, and means including a pressure roller for engaging said mediums at said common point for maintaining successive portions of said mediums in frictional driving contact with each other as said mediums travel along said paths whereby the other of said pair of mediums is driven by said one medium through said frictional driving contact between said mediums.

5. A system for transporting each of a pair of reelable magnetic tape mediums between a different pair of reels comprising guiding means defining different paths of travel for each of said mediums between said reels wherein said mediums are separated from each other, means disposed along said paths of travel of said mediums for engaging and driving one and only one of said mediums, and means disposed on opposite sides of said paths for engaging said mediums with each other at a single point common to said paths for maintaining successive portions of said mediums in driving contact with each other so that said one medium drives the other of said pair of mediums as said mediums travel along said paths.

6. A system for duplicating magnetic tape records comprising a pair of spaced reels along a path between which travels a prerecorded master record, another pair of spaced reels along another path between which travels a blank record tape on which the master record is to be duplicated, a magnetic structure for establishing a magnetic field to effect the duplication of said master record, a pressure roller and said magnetic structure being disposed on opposite sides of said paths of travel of said tapes, said pressure roller and said structure being relatively displaceable toward each other to engage said tapes and maintain contact therebetween, another pressure roller spaced from said structure and first-named pressure roller along said paths of travel and disposed between said paths of travel to engage said master and said duplicate tapes, and a capstan disposed on the opposite side of one of said tapes from said other pressure roller, said capstan and said other pressure roller being relatively movable to engage said one tape for driving said master and duplicate tapes.

7. A system for duplicating magnetic tape records comprising a pair of spaced reels along a path between which travels a master record, another pair of spaced reels along another path between which travels a blank record tape on which the master record is to be duplicated, a magnetic structure for establishing a magnetic field to effect the duplication of said master records and a pressure roller disposed on opposite sides of said paths of travel of said tapes, said pressure roller and said structure being relatively displaceable toward each other to engage said tapes and maintain contact therebetween, another pressure roller spaced from said structure and first-named pressure roller along the path of travel of one of said tapes, and a capstan disposed on the opposite side of said path of travel of said one tape from said other pressure roller, said capstan and said other pressure roller being relatively movable to engage said one tape for driving said master and duplicate tapes.

8. A system for providing a duplicate magnetic tape record from a master tape record comprising a magnetic structure for establishing a magnetic field to effect the duplication of said master tape record and a pressure roller disposed on opposite sides of said master and duplicate tapes, said pressure roller and said structure being relatively displaceable toward each other to engage said tapes and maintain frictional driving contact therebetween, another pressure roller spaced from said structure and first-named pressure, roller and disposed to engage a portion of one of said tapes spaced from preceding said contacting portions of said master and said duplicate tapes, and a capstan disposed on the opposite side of said one of said tapes from said other pressure roller, said capstan and said other pressure roller being relatively movable to engage said one tape for driving said master and duplicate tapes through said frictional driving contact established between said first named pressure roller and said structure.

References Cited in the file of this patent

UNITED STATES PATENTS

| | | |
|---|---|---|
| 1,846,110 | Hornauer | Feb. 23, 1932 |
| 2,297,242 | Pohlmann | Sept. 29, 1942 |
| 2,666,813 | Camras | Jan. 13, 1954 |
| 2,686,229 | Blaney | Aug. 10, 1954 |
| 2,705,599 | McCollough | Apr. 5, 1955 |
| 2,738,383 | Herr et al. | Mar. 13, 1956 |
| 2,747,026 | Camras | May 22, 1956 |

UNITED STATES PATENT OFFICE
CERTIFICATE OF CORRECTION

Patent No. 3,037,090 May 29, 1962

Athans Bouzemburg

It is hereby certified that error appears in the above numbered patent requiring correction and that the said Letters Patent should read as corrected below.

Column 6, line 8, after "pressure" strike out the comma; lines 9 and 10, strike out "preceding".

Signed and sealed this 7th day of May 1963.

(SEAL)

Attest:

ERNEST W. SWIDER
Attesting Officer

DAVID L. LADD
Commissioner of Patents